United States Patent [19]

Flutti et al.

[11] Patent Number: 4,708,907

[45] Date of Patent: Nov. 24, 1987

[54] WRITABLE ADHESIVE TAPE

[75] Inventors: Fulvio Flutti, Cernobbio; Franco Ghezzi, Savona, both of Italy

[73] Assignee: Boston S.p.A., Bollate, Italy

[21] Appl. No.: 727,467

[22] Filed: Apr. 26, 1985

[30] Foreign Application Priority Data

May 4, 1984 [IT] Italy ................................ 20815 A/84

[51] Int. Cl.⁴ ................................................ C09J 7/02
[52] U.S. Cl. .................................... 428/352; 428/195; 428/343; 428/354; 428/355; 428/424.8; 428/483; 428/495; 525/154; 525/157; 525/160; 525/164
[58] Field of Search ............... 428/352, 354, 355, 483, 428/495, 424.8, 505, 195, 343; 525/154, 157, 160, 164

[56] References Cited

U.S. PATENT DOCUMENTS

| | | | |
|---|---|---|---|
| 3,271,335 | 9/1966 | Bostian et al. ........................ | 525/164 |
| 3,916,063 | 10/1975 | Dratz et al. .......................... | 428/505 |
| 4,070,523 | 1/1978 | Blum ..................................... | 428/354 |
| 4,138,527 | 2/1979 | Malek .................................... | 428/354 |

FOREIGN PATENT DOCUMENTS

| | | | |
|---|---|---|---|
| 667331 | 7/1963 | Canada ................................. | 428/354 |
| 166245 | 12/1980 | Japan ..................................... | 428/354 |
| 2103513 | 2/1983 | United Kingdom . | |

*Primary Examiner*—George F. Lesmes
*Assistant Examiner*—S. A. Gibson
*Attorney, Agent, or Firm*—Guido Modiano; Albert Josif

[57] ABSTRACT

A writable adhesive tape is disclosed, which comprises a polyolefine substrate, having on one side an adhesive layer and on the opposite side a writable anti-adhesive layer. The writable anti-adhesive layer comprises 25% to 55% by weight of a chlorinated polyolefine, 20% to 50% by weight of a polyaldehyde resin together with 5% to 20% by weight of an anti-adhesive agent, and 5% to 25% by weight of a matting charge.

16 Claims, No Drawings

WRITABLE ADHESIVE TAPE

Currently known are adhesive tapes which comprise a substrate, mostly formed from a flexible plastic material, having on one side a coating or layer of an adhesive which, in use, adheres when applied with a slight pressure, i.e. an adhesive layer, and on the opposite side an anti-adhesive coating or layer which is also suited to be written or printed upon (the term "writable" will be used hereinafter for brevity) by means of any ordinary writing or printing means.

In fact, that coating, which has in such tapes the function of a writable layer is also required to perform an anti-adhesive or "release" function (release coating). This because adhesive tapes are mostly sold in the form of rolls wherein the tacky side contacts, owing to the rolling up, the juxtaposed writable side.

Thus, in order for the tape to be easily unrolled without damage to the tape iself, it is necessary to prevent the writable side facing the adhesive "layer" from sticking to the latter, i.e. to make it adhesion-preventing.

Several writable self-sticking(adhesive)tapes have been suggested in the past, which differ from one another by the nature of the components which make up the substrate, adhesive layer, and anti-adhesive layer, as well as by the nature of the means utilized to make the anti-adhesive layer writable. In general, the anti-adhesive layer is made writable by roughening or matting it by mechanical means or by incorporating therein some fillers, e.g. mineral fillers.

Tapes have been suggested for example, wherein the anti-adhesive writable layer included a polyurethane resin as a film-generating resin, and an anti-adhesive and matting agent (see U.S. Pat. No. 4,138,527). Said patent mentions polyvinylchloride as a preferred substrate for the suggested self-sticking tape, although it also discloses some other suitable substrates, such as polypropylene.

However, we have experimentally acertained that, on a polypropylene substrate, the release or anti-adhesive layer taught by the aforementioned U.S. patent was inadequatley secured, and the risk existed that, upon unrolling the tape, said anti-adhesive layer might be stripped off the substrate, thus making the tape unusable.

British Patent Application No. 2103513 discloses a writable adhesive tape, wherein, on a polypropylene substrate, a writable layer is applied which again comprises polypropylene incorporating fine particles of an inorganic filler. In this particular instance, therefore, a secure bond between the writable layer and polypropylene substrate was achieved by using the polypropylene itself as a film-generating resin in the writable layer as well.

Further self-sticking tapes have been suggested comprising, as the anti-adhesive coating suited to be marked as by writing or printing, a film-generating resin, in particular a polyester resin, a polyketone resin meant to impart printability, and conventional anti-adhesive agents (U.S. Pat. No. 4,070,523).

The self-sticking coatings recommended heretofore for writable self-sticking tapes, have the disadvantage of being difficult to use with olefininc polymer substrates which have not been previously coated, on the back side intended to receive the anti-adhesive agent, with a bonding or primer layer, or have not been subjected, on that same side, to a surface treatment of the chemical or electronic type (corona effect, flame treatment, etc.). This holds particularly true for polypropylene substrate tapes owing to the inadequate bonding that can be obtained between known compositions for the anti-adhesive writable coating and polypropylene.

It is a primary object of this invention to provide a self-sticking tape that can be easily written upon and unrolled, while economically advantageous.

In particular, it is an object of the invention to provide a self-sticking tape having an anti-adhesive writable layer that can be very well secured to an economically advantageous polyolefinic substrate.

A further object of this invention is to provide a self-sticking tape of the type mentioned above, which requires no additional priming layers, nor any surface treatment of the chemical, electronic, or flame type to ensure integrity of its structure.

These and other objects, such as will be apparent hereinafter, are achieved by a self-sticking tape according to the invention, which comprises a flexible plastic material substrate, a self-sticking coating on one side thereof, and an anti-adhesive writable coating on the opposite side, characterized in that said substrate is selected from oriented and non-oriented films of alpha-olefine polymers and copolymers, and said anti-adhesive writable coating comprises at least one chlorinated polyolefine and a polyaldehyde resin as the film forming and the adhesive promoters to the substrate, along with at least one anti-adhesive agent and at least one matting agent.

It has, in fact, been found that the simultaneous presence, in the anti-adhesive layer of the inventive tape, of the chlorinated polyolefine and polyaldehydic resin, confers to said layer optimum film-forming and bonding properties toward the polyolefinic substrate, such as not to jeopardize the tape integrity when unrolling even in the absence of any further bonding layer or treatment. Furthermore, the anti-adhesive layer of the inventive tape, incorporating the aforesaid anti-adhesive and matting agents, shows a high degree of uniformity both in appearance and writability or printability, which remains unaltered after the tape has been wound and unwound in use.

It has also been found that the tape of this invention is particular advantageous also with heliographic printing techniques, where it affords a high quality printing. Moreover, the tape proved to have profitable easy tear properties in the transversal direction, which greatly facilitates its use in practical usual applications.

The chlorinated polyolefin which may be used in the tape of this invention, may be any homopolymer or copolymer polyolefine having a chlorine content in the 15% to 65% range, or mixtures thereof, and a suitable molecular weight for film formation, a Brookfield viscosity preferably in the 75 to 180 centipoises range and a specific gravity at 25°/25° C. preferably in the 0.850 to 0.950 range, for 25% solutions in xylene. By way of example, chlorinated polyolefines may be used which are available commercially under the trade designations of CP 343, produced by Eastman Kodak, U.S.A., or HARDLEN, produced by Toyo Kasey Kogyo, Japan, or TRAPYLEN, produced by Rowa, Germany. The chlorinated polyolefin varies in amount from 25% to 55%, preferably 35% to 40% by weight relative to the overall weight (dry) of the anti-adhesive layer components in the final product.

A usuable polyaldehyde resin may be any polyaldehyde resin obtained by reaction of a 4-to-8 carbon atoms, linear or branched chain aliphatic aldehyde such as isobutylaldehyde with urea. Among the suitable polyaldehydes is the one available from BASF under the trade name LAROPAL 8652. The usable amount of polyaldehyde ranges from 20% to 50%, preferably 30% to 40%, by dry weight.

In addition to the two film-forming resins used in the anti-adhesive writable layer of the tape of this invention, the layer may include, according to alternative embodiments of the invention, further resin components.

Thus, according to another embodiment of the anti-adhesive writable layer, this comprises 25% to 50% of said chlorinated polyolefine, 15% to 30% of said polyaldehyde, together with 5% to 20% of a linear elastomeric polyurethane as film-forming resins, in addition to said anti-adhesive agent and said matting agent.

Preferably, for the film-forming and bonding resins, the following proportions are used in this embodiment: 35% to 40% chlorinated polyolefin, 20% to 25% polyaldehyde, and 10% to 15% polyurethane.

The usable polyurethane is a linear elastomeric polyurethane having preferably a high crystallinity. As an example, a polyurethane obtained by reacting a polyester having end hydroxyl groups, as derived from a dicarboxylic acid of 4 to 10 carbon atoms and a diol of 4 to 10 carbons, with an aliphatic or aromatic di-isocyanate, may be used. Also a polyester obtained by the reaction of adipic acid with hexanediol and then cross-linked with toluene-di-isocyanate, may be used.

By way of example, a viable polyurethane is the one available from BASF under the trade name of LUPHEN P 1420.

The anti-adhesive function is provided by incorporating, into the anti-adhesive layer of the inventive tape, an anti-adhesive or release agent selected from those conventionally utilized for the same purpose. Among such agents may be mentioned the polyvinylalkylcarbamates, e.g. polyvinyloctadecylcarbammate, the alkylurethanes of polyvinylalcohols, and the amides of fatty acids and polyethyleneimine. The anti-adhesive agent is used in amounts ranging from 5% to 20%, preferably 10% to 15% by weight of the overall weight of the components in the anti-adhesive layer.

The anti-adhesive layer is made writable by the incorporation of a matting agent, in accordance with conventional techniques. As the matting agent, an inorganic material may be used in the form of finely divided particles, such as talc, silica, calcium carbonate, etc., a high purity silica being preferred, for instance SYLOYD from W.R. Grace, U.S.A. The dulling filler should be used in amounts ranging from 5% to 25%, preferably 10% to 15%, by weight of the overall dry weight of the anti-adhesive layer components.

The substrate to be used in the tape according to the invention is an olefinic homopolymer or copolymer, such as polyethylene, polypropylene, or copolymers thereof. The invention has shown to be specially advantageous with polypropylene substrates. The substrate may be uni-oriented, bi-oriented, or unoriented.

When cutting the final product into small rolls, the tape edges are made easy to cut in the transversal direction, both manually and through automatic or manual dispensers, by creating microindentations which facilitate starting of the crosswise cut. These micro-indentations are formed, in conformity with conventional techniques, by means of cutting blades, usually termed "score cutting".

The adhesive layer of the tape of this invention is formed with adhesive products conventionally employed with such tapes, like an adhesive material including acrylic, polyurethane, or polyester copolymers, or natural or synthetic rubbers and natural or synthetic resins adhesives.

The tape of this invention is prepared by applying to the polyolefinic substrate the anti-adhesive layer and adhesive layer, respectively, preferably in the form of a solution or dispersion in suitable solvents, according to conventional techniques, and then removing the solvents by evaporation. The anti-adhesive layer of this invention may be applied, for example, in the form of a solution or dispersion in a hydrocarbon solvent, such as toluene, by mixing 95% to 70%, preferably 85% to 75%, of said solvent together with 5% to 30%, preferably 15% to 25%, of the mixture of the anti-adhesive layer components, with the use of such coating arrangements as rotogravure, wire bar (Meyer bar), rotosilk-screening, etc. The thicknesses of the substrate and of the adhesive and anti-adhesive writable layers are uncritical in the inventive tape. Usually, thicknesses preferably in the 25 to 40 $\mu$m range are used for the substrate, in the 0.4 to 10 $\mu$m range for the anti-adhesive layer, and in the 18 to 32 $\mu$m range for the adhesive layer.

The resulting adhesive tape is easily unwound, adheres perfectly to different surfaces, becomes perfectly transparent on application, may be photocopied, is specially suitable for heliographic duplication as practiced in the workrooms of engineering draftsmen, is unalterable with time, and is writable by all ordinary writing methods, and in particular, with all types of pencils.

The Example which follows is given by way of illustration, so as to make the invention more clearly understood, and is not to be construed as limiting the scope of the invention.

EXAMPLE

The following components are mixed together in a fast mixer of the blade type, according to known techniques, in toluene as a solvent. While heating gradually to 50° C., 11 parts by weight (dry) of 25% polyvinyloctadecylcarbamate are added to the toluene. Once the product has been homogenized, 35 parts by weight (dry) Laropal 8652 are added; the mixture is again homogenized, and 40 parts by weight (dry) Eastman CP323 and 14 parts by weight (dry) Syloid 276 are slowly added.

The resulting suspension has a solids content of 20% and can be stored at room temperature.

The mixture is then coated, while maintaining it at about 40° C., using a coating method of the wire bar type, to a thickness of 12 g/m$^2$ wet, over the untreated side of a bi-oriented polypropylene film having a thickness of 35 $\mu$m and dried for 20 seconds at 80° C. on an industrial-type coating machine.

The other side of the substrate is then coated with a solvent adhesive comprising a butylacrylateacrylonitrile-acrylic acid copolymer in an hexane-toluene solvent, the coat is dried for 50 seconds at 80° C., and finally, the product is wound into rolls about 2,000 m long. The material can be stored wound in a roll for long periods, and is then converted into smaller rolls for consumer's use. The tape thus obtained is easily unwound is free of surface flaws, can be applied either manually or with automatic systems, and retains its properties unaltered with time.

Specifically, the tape can receive on its back any type of marking, both in ink and especially pencil. the marking is stable with time and of the same intensity as on usual writing paper. The tape is particularly transparent on application, and invisible on photocopies and, in particular, on blueprints.

What is claimed is:

1. A self-sticking tape, comprising a flexible substrate, a self-sticking coating on one side thereof, and an anti-adhesive writable coating on the opposite side, comprising at least one film forming resin along with at least one anti-adhesive agent and at least one matting agent, wherein said substrate is selected from oriented and non-oriented films of alpha-olefine polymers and copolymers, having at least the side bearing said anti-adhesive coating free from any additional priming layer and adhesion promoting surface treatment, and said anti-adhesive writable coating comprises 25% to 55% by weight of at least one chlorinated polyolefine and 20% to 50% by weight of a polyaldehyde resin as said film-forming resin and as substrate adhesive promoter resin.

2. A self-sticking tape, according to claim 1, wherein said anti-adhesive writable coating comprises 5% to 20% by weight of said at least one anti-adhesive agent and 5% to 25% by weight of said at least one matting agent.

3. A tape according to claim 1, wherein said substate is a polypropylene substrate.

4. A self-sticking tape, according to claim 1, wherein said anti-adhesive writable coating comprises 35% to 40% by weight of said chlorinated polyolefine, 30% to 40% of said polyaldehyde, 10% to 15% of said anti-adhesive agent, and 10% to 15% of said matting agent.

5. A tape according to claim 1, wherein said chlorinated polyolefine is a homopolymer or copolymer film-forming polyolefine having a chlorine content of 15% to 65%.

6. A tape according to claim 1 wherein said said polyaldehyde resin is a film-forming resin obtained by the condensation of a linear or branched chain aliphatic aldehyde with 4 to 8 carbon atoms in the aliphatic chain with urea.

7. A tape according to claim 1, wherein said anti-adhesive agent is selected from polyvinylalkylcarbamates, alkylurethanes of polyvinylalcohols, and amides of fatty acids, and polyethyleneimine.

8. A tape according to claim 1, wherein said matting agent comprises silica.

9. A tape according to claim 1, wherein said anti-adhesive writable coating further comprises a linear elastomeric polyurethane.

10. A tape according to claim 9, wherein said anti-adhesive writable coating comprises 25% to 50% by weight of said chlorinated polyolefine, 15% to 30% by weight of said polyaldehyde resin, and 5% to 20% by weight of said linear elastomeric polyurethane as the film-forming and substrate adhesive promoters resin.

11. A tape according to claim 10, wherein said anti-adhesive writable coating comprises 35% to 40% by weight of said chlorinated polyolefine, 20% to 25% by weight of said polyaldehyde, 10% to 15% by weight of said linear elastomeric polyurethane, 10% to 15% by weight of said anti-adhesive agent, and 10% to 15% by weight of said matting agent.

12. A tape according to any of claims 9 to 11, wherein said linear elastomeric polyurethane is the reaction product of a hydroxy-terminated polyester of a dicarboxylic acid of 4 to 10 carbon atoms and a diol of 4 to 10 carbon atoms with an aliphatic or aromatic di-isocyanate.

13. A tape according to claim 10, wherein said linear elastomeric polyurethane is the reaction product of a hydroxy-terminated polyester of a dicarboxylic acid having 4 to 10 carbon atoms and a diol having 4 to 10 carbon atoms with an aliphatic or aromatic di-isocyanate.

14. A tape according to claim 9, wherein said substrate is a polypropylene substrate.

15. A tape according to either claim 9 or 10, wherein said chlorinated polyolefine is a homopolymer or copolymer film-forming polyolefine having a chlorine content of 15% to 65%.

16. A tape according to claim 10, wherein said polyaldehyde resin is a film-forming resin obtained by condensation of a linear or branched chain aliphatic aldehyde of 4 to 8 carbon atoms with urea.

* * * * *